US008583679B2

United States Patent
Ahn et al.

(10) Patent No.: US 8,583,679 B2
(45) Date of Patent: Nov. 12, 2013

(54) METHOD OF PROVIDING BY-VIEWPOINT PATENT MAP AND SYSTEM THEREOF

(75) Inventors: Hanjoon Ahn, Seoul (KR); Mikyung Jung, Seoul (KR); Jeongjoong Kim, Seoul (KR); Sungho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 13/318,068

(22) PCT Filed: May 10, 2010

(86) PCT No.: PCT/KR2010/002960
§ 371 (c)(1),
(2), (4) Date: Oct. 28, 2011

(87) PCT Pub. No.: WO2010/137814
PCT Pub. Date: Dec. 2, 2010

(65) Prior Publication Data
US 2012/0054170 A1    Mar. 1, 2012

(30) Foreign Application Priority Data
May 25, 2009    (KR) .................... 10-2009-0045537

(51) Int. Cl.
*G06F 17/30*    (2006.01)
(52) U.S. Cl.
USPC ........................ 707/769; 707/758; 707/759
(58) Field of Classification Search
USPC ........................ 707/769, 758, 759
See application file for complete search history.

(56) References Cited

U.S. PATENT DOCUMENTS

| 6,649,849 | B2 * | 11/2003 | Bass et al. ............. 177/25.15 |
| 8,117,207 | B2 * | 2/2012 | Mushtaq et al. ........... 707/748 |
| 2002/0183890 | A1 * | 12/2002 | Bass et al. ............. 700/213 |
| 2003/0026459 | A1 | 2/2003 | Won et al. |
| 2007/0078670 | A1 * | 4/2007 | Dave et al. ............. 705/1 |
| 2009/0076997 | A1 * | 3/2009 | Ducheneaut et al. ........ 706/47 |
| 2009/0265322 | A1 * | 10/2009 | Asai et al. ............. 707/3 |
| 2009/0265332 | A1 * | 10/2009 | Mushtaq et al. .......... 707/5 |
| 2012/0143597 | A1 * | 6/2012 | Mushtaq et al. .......... 704/9 |

FOREIGN PATENT DOCUMENTS

| JP | 2003-44493 A |   | 2/2003 |
| JP | 2003141164 A | * | 5/2003 |
| JP | 2008-204285 A |   | 9/2008 |
| KR | 1999-0087858 A |   | 12/1999 |
| KR | 10-2007-0048892 A |   | 5/2007 |

OTHER PUBLICATIONS

Oka Akihro, English Translated Version of JP 2003141164A, May 16, 2003, 13 pages.*

(Continued)

*Primary Examiner* — Frantz Coby
(74) *Attorney, Agent, or Firm* — Birch, Stewart, Kolasch & Birch, LLP

(57) ABSTRACT

A method of providing a by-viewpoint patent map. According to the method, patent documents to which a by-viewpoint classification codes are assigned are searched and the by-viewpoint classification codes are extracted from the searched patent documents. Then, the searched documents are classified by the by-viewpoint classification codes and the by-viewpoint classification codes are grouped into a first viewpoint and a second viewpoint. Next, a by-viewpoint patent map is generated based on classification titles assigned to the by-viewpoint classification codes; and the generated by-viewpoint patent map is displayed.

18 Claims, 12 Drawing Sheets

(56) References Cited

OTHER PUBLICATIONS

Fujii et al., "Overview of Patent Retrieval Task at NTCIR-4", Proceedings of NTCIR-4, Apr. 2003-Jun. 2004, 9 pages, provided, XP055049993.

Iwayama et al., "Overview of Classification Subtask at NTCIR-5 Patent Retrieval Task", Proceedings of NTCIR-5 Workshop Meeting, Dec. 6-9, 2005, 9 pages provided, XP055049979.

Schellner, "Japanese File Index Classification and F-terms", World Patent Information, vol. 24, 2002, pp. 197-201, XP004376256.

\* cited by examiner

Fig. 1

| | | Optical communication system | | | | | |
|---|---|---|---|---|---|---|---|
| | 5K102 | H04B9/00-9/00@Z | | | | | |
| AA | | AA00 | AA01 | AA02 | AA03 | AA04 | AA05 | |
| | PURPOSE OR PROBLEMS | . Measures against noise (S/N or C/N), distortion, or signal deterioration | . Capacity increasing for communication capacitance | . Multiplexing (Increasing multiplex number, e.g. multiwavelength) | . . Increased capacity per wavelength | . . Increased capacity by electrical stages | ... |
| | | | AA11 | AA12 | AA13 | | AA15 | |
| | | | . Economy improvement | . Effective uses of existing facilities. | . Prolonging lives, or measures against aging degradation for optical devices | | . Downsizing, weight reduction, or simplification of constructions | ... |
| | | | AA21 | AA22 | AA23 | AA24 | AA25 | |
| | | | . Improvement of characteristics of optical space transmission | . . Optical axis adjustment for optical space transmission | . . . Initial setting | . . . Automatic tracking | . . Change of beam diameters | ... |
| | | | AA31 | AA32 | | AA34 | AA35 | |
| | | | : | : | : | : | : | |

(labels: 11, 12, 13, 15, 14)

Fig. 2

| | | TELEPHONE CIRCUITS | | | | | | |
|---|---|---|---|---|---|---|---|---|
| | 5K027 | H04M1/00–1/00@Z;1/24–1/253;1/58–1/62;1/66–1/82;99/00 | | | | | | |
| | BB00 | BB01 | BB02 | BB03 | BB04 | BB05 | BB06 | ... |
| | PURPOSE; EFFECT | . Improvement of usability | . Improvement of operability | . Improvement of call quality | . Improvement of reliability | . Prevention of malfunctions | . Countermeasures against power failure | ... |
| BB | | BB11 | BB12 | | BB14 | BB15 | | ... |
| | | . Compensation for line loss | . Impedance matching with lines | | . Size reduction; Cost reduction | . . by using the same components | | ... |
| | 5K028 | Time-division multiplex systems H04J3/00-3/26;H04L5/22-5/26 | | | | | | |
| | AA00 | AA01 | AA02 | AA03 | AA04 | AA05 | AA06 | ... |
| | PURPOSES AND EFFECTS | . Quality improvement | . Reduction of crosstalk between channels | . Reduction of jitter | . Improvement of noise resistance | | . Structural simplification | ... |
| AA | | AA11 | AA12 | | AA14 | AA15 | | ... |
| | | . Improvement of circuit working efficiency | . Compression of informational content or bandwidth | | . Improvement of reliability | . Prevention of malfunction | | ... |
| | ... | ... | ... | ... | ... | ... | ... | ... |

Fig. 5

| F-term code | PATENT NUMBER |
|---|---|
| F1 | PN1, PN2, PN3 |
| F2 | PN3, PN4, PN5, PN6 |
| F3 | PN2, PN4 |
| F4 | PN4, PN7, PN8 |
| F5 | PN1, PN9, PN10, PN11 |
| F6 | PN13, PN14 |
| F7 | PN15, PN16, PN17, PN18, PN19 |
| F9 | PN3, PN5, PN7, PN9 |
| F10 | PN11, PN13, PN15, PN16 |
| F11 | PN3, PN5, PN7, PN9 |
| F12 | PN15, PN16, PN17, PN18, PN19 |
| F13 | PN4, PN7, PN8 |
| F14 | PN3, PN5, PN7, PN9 |
| F15 | PN13, PN14 |
| F16 | PN1, PN2, PN3 |

Fig. 6

| VIEWPOINT | CLASSIFICATION TITLE | F-term code | PATENT NUMBER |
|---|---|---|---|
| Problem | VISIBILITY IMPROVEMENT BY CONTRAST ENHANCEMENT | F1 | PN1, PN2, PN3 |
| Problem | VISIBILITY IMPROVEMENT BY HIGH DEFINITION | F2 | PN3, PN4, PN5, PN6 |
| Problem | VISIBILITY IMPROVEMENT BY WIDE ANGLE VIEW | F3 | PN2, PN4 |
| Problem | MATERIAL REDUCTION | F4 | PN15, PN16, PN17, PN18, PN19 |
| Problem | SOLUTION TO CONTRAST PROBLEM | F5 | PN3, PN5, PN7, PN9 |
| Problem | CELL THICKNESS UNIFORMIZATION | F6 | PN11, PN13, PN15, PN16 |
| Problem | ALIGNMENT UNIFORMIZATION | F7 | PN10, PN11, PN13 |
| Solution | SUBSTRATE | F8 | PN4, PN7, PN8 |
| Solution | ELECTRODE | F9 | PN1, PN9, PN10, PN11 |
| Solution | ALIGNMENT MATERIAL | F10 | PN13, PN14 |
| Solution | INSULATION LAYER | F11 | PN3, PN5, PN7, PN9 |
| Solution | MOUNTING STRUCTURE | F12 | PN15, PN16, PN17, PN18, PN19 |
| Solution | POWER OF DRIVING CIRCUIT | F13 | PN4, PN7, PN8 |
| Solution | ACTIVE DEVICE OF DRIVING CIRCUIT | F14 | PN3, PN5, PN7, PN9 |
| Solution | OPTICAL CONDUCTOR OF DRIVING CIRCUIT | F15 | PN13, PN14 |
| Solution | MOUNTING METHOD | F16 | PN1, PN2, PN3 |

Fig. 7

| VIEWPOINT | | NEW CLASSIFICATION TITLE | F-term code | PATENT NUMBER |
|---|---|---|---|---|
| Problem | VISIBILITY IMPROVEMENT | VISIBILITY IMPROVEMENT BY CONTRAST ENHANCEMENT | F1 | PN1, PN2, PN3 |
| Problem | | VISIBILITY IMPROVEMENT BY HIGH DEFINITION | F5 | PN3,PN5,PN7,PN9 |
| Problem | | VISIBILITY IMPROVEMENT BY WIDE ANGLE VIEW | F2 | PN3, PN4, PN5, PN6 |
| Problem | | MATERIAL REDUCTION | F3 | PN2, PN4 |
| Problem | | CELL THICKNESS UNIFORMIZATION | F4 | PN15,PN16,PN17,PN18,PN19 |
| Problem | | ALIGNMENT UNIFORMIZATION | F6 | PN11,PN13, PN15, PN16 |
| Solution | | SUBSTRATE | F7 | PN10, PN11, PN13 |
| Solution | | ELECTRODE | F8 | PN4, PN7, PN8 |
| Solution | | ALIGNMENT MATERIAL | F9 | PN1, PN6, PN10, PN1' |
| Solution | | INSULATION LAYER | F10 | PN13,PN14 |
| Solution | | MOUNTING STRUCTURE | F11 | PN3,PN5,PN7,PN9 |
| Solution | DRIVING CIRCUIT | POWER OF DRIVING CIRCUIT | F12 | PN15,PN16,PN17,PN18,PN19 |
| Solution | | ACTIVE DEVICE OF DRIVING CIRCUIT | F16 | PN1, PN2, PN3 |
| Solution | | OPTICAL CONDUCTOR OF DRIVING CIRCUIT | F13 | PN4, PN7, PN8 |
| | | | F14 | PN3,PN5,PN7,PN9 |
| | | | F15 | PN13,PN14 |

| Problems / Solution | VISIBILITY IMPROVEMENT | | | MATERIAL REDUCTION | CELL THICKNESS UNIFORMIZATION | ALIGNMENT UNIFORMIZATION | AVERAGE APPLICATION YEAR |
|---|---|---|---|---|---|---|---|
| | CONTRAST | HIGH DEFINITION | WIDE ANGLE VIEW | | | | |
| SUBSTRATE | 22 | 52 | 16 | 6 | 7 | 2 | 2004 |
| ELECTRODE | 73 | 131 | 14 | 24 | 21 | 23 | 1994 |
| ALIGNMENT MATERIAL | 18 | 33 | 14 | 7 | 5 | 1 | 1993 |
| INSULATION LAYER | 13 | 22 | 4 | 10 | 0 | 1 | 1995 |
| MOUNTING STRUCTURE | 14 | 29 | 8 | 4 | 9 | 4 | 1996 |
| POWER SOURCE | 17 | 18 | 2 | 3 | 8 | 3 | 1997 |
| DRIVING CIRCUIT — ACTIVE DEVICE | 19 | 11 | 5 | 6 | 2 | 0 | 1994 |
| DRIVING CIRCUIT — OPTICAL CONDUCTOR | 9 | 18 | 6 | 2 | 2 | 8 | 1993 |
| AVERAGE APPLICATION YEAR | 1995 | 1993 | 1994 | 1996 | 1993 | 1992 | |

| SELECT | | NUMBER OF RELATED PATENTS |
|---|---|---|
| ☑ | ● MERGE TO PROBLEM | 132 |
| ☐ | | 121 |
| ☐ | | 109 |
| ☐ | MERGE NAME : | 92 |
| ☐ | | 52 |
| ☐ | APPLY | 34 |
| ☐ | | 28 |
| ☐ | MATERIAL REDUCTION | 26 |
| ☐ | CELL THICKNESS UNIFORMIZATION | 10 |
| ☐ | ALIGNMENT UNIFORMIZATION | 18 |

| MERGE SELECTED PROBLEM | DELETE SELECTED PROBLEM | Tree Map |
|---|---|---|
| 107 | 108 | 109 |

106

Fig. 14
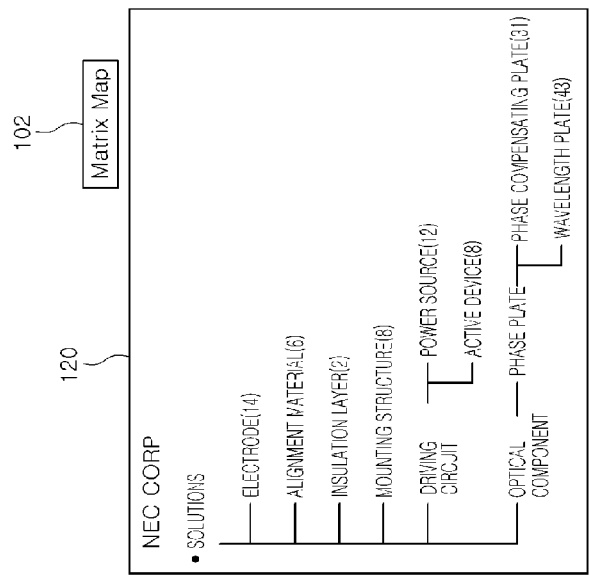
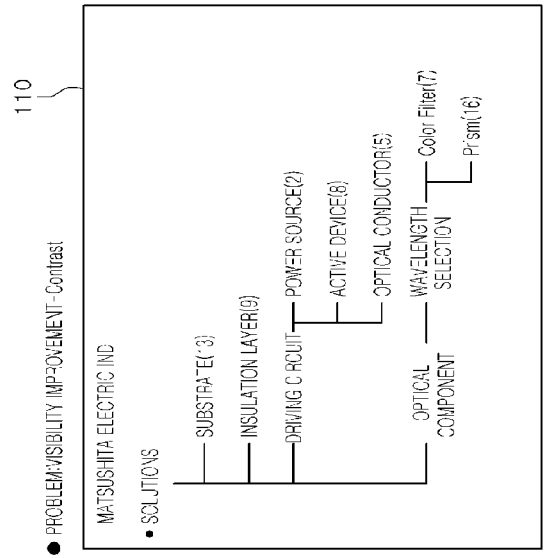
Fig. 15
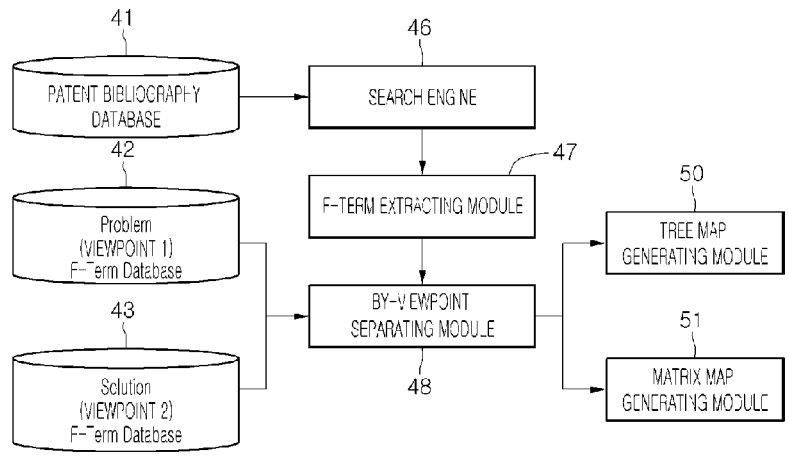

METHOD OF PROVIDING BY-VIEWPOINT PATENT MAP AND SYSTEM THEREOF

TECHNICAL FIELD

The present application claims the benefit of priority under 35 U.S.C. 119 to Korean Patent Application No. 10-2009-0045537 filed on May 25, 2009 which is hereby incorporated by reference in its entirety.

BACKGROUND ART

The present invention relates to a method of providing a by-viewpoint patent map, which suggests directions of idea developments or intuitively provides various kinds of information about patent documents, and more particularly to, a method of providing a by-viewpoint patent map, which helps researchers to develop a variety of ideas by performing patent searches on patent documents with by-viewpoint classification codes such as F-term codes and displaying the number of patent documents based on classification titles from the search results, and a storage medium where software is stored for realizing the method.

In general, a patent applicant who wants to obtain his/her patent rights needs to refer to and search patent documents in order to decide whether there was/is a prior art or not. Most patent document searches require a keyword input.

Recently, the importance of evaluation on these patent documents which may be used as a standard for measuring the technological levels of research institutions of enterprises, countries, and universities is gradually increasing. For example, the accurate evaluation of the patent levels or directions of enterprises and so on is indispensable to the technological strategies of the enterprises, the investor s investment decision, and the judgment on the researcher s ability, and it is applied similarly to research institutions of countries or universities.

With the recent technological developments, the number of patent applications is increasing, and thus, the quantity of patent documents is also increasing. Accordingly, searching of patent documents needs to be conducted for preventing the redundant researches, or confirming the right infringement, or searching a prior art before filing the patent application, or examining the technological development of other companies, or promoting the research and development. However, the searching of the patent documents is not easily accomplished generally.

In a related art search system for searching or examining these patent documents, a large quantity of unnecessary information may be included if inadequate keywords are selected. In such a case, examining the patent documents itself requires more time.

In order to analyze these enormous patent documents, there are conventional patent classification standards such as International Patent Classification (IPC) or US Patent Classification (UPC). However, since these patent classification standards just simply classify massive technical fields through a top-down method, there is limitations in using them for idea developments.

The Japan Patent Office (JPO) develops and distributes an F-term code classification table based on different classification standards. That is, patent documents are classified by viewpoints. The F-term classifies patent documents by problem, solution, and application fields.

DISCLOSURE OF INVENTION

Technical Problem

A method of utilizing this classification table for idea developments is required.

Solution to Problem

Embodiments provide a by-viewpoint patent map available for idea developments and research and development processes.

Embodiments also provides a method of generating an intuitive and easily understandable by-viewpoint patent map by classifying patents, which are searched by rearranged by-viewpoint classification titles, through an already existing patent classification table.

In one embodiment, a method of providing a by-viewpoint patent map includes: searching patent documents to which by-viewpoint classification codes are assigned; extracting the by-viewpoint classification codes from the searched patent documents; classifying the searched documents by the by-viewpoint classification codes; grouping the by-viewpoint classification codes into a first viewpoint and a second viewpoint; generating a by-viewpoint patent map based on classification titles assigned to the by-viewpoint classification codes; and displaying the generated by-viewpoint patent map.

The generating of the by-viewpoint patent map may include extracting and recording the number of patent documents that belong to classification titles corresponding to the first viewpoint and the second viewpoint.

The method may include: arranging the classification titles corresponding to the first viewpoint and the second viewpoint on a horizontal axis and a vertical axis, respectively; and displaying the number of the searched patent documents corresponding to the arranged classification titles.

The first viewpoint and the second viewpoint may be problem and solution, respectively.

The generating of the by-viewpoint patent map may include: displaying a list of new classification titles of the first viewpoint; receiving one, selected by a user, of the displayed classification titles; and displaying classification titles of the second viewpoint with respect to the selected classification title.

In another embodiment, a method of providing a by-viewpoint patent map includes: searching patent documents; generating a by-viewpoint patent map that indicates classification according to a first viewpoint and a second viewpoint based on the search results; displaying a list of classification titles of the first viewpoint; receiving one, selected by a user, of the displayed classification titles of the first viewpoint; and displaying classification titles of the second viewpoint with respect to the selected classification title.

The generating of the by-viewpoint patent map may include: extracting by-viewpoint classification codes from the searched patent documents; classifying the searched patent documents by the by-viewpoint classification codes; grouping the by-viewpoint classification codes into the first viewpoint and the second viewpoint; and generating a by-viewpoint patent map based on classification titles assigned to the by-viewpoint classification codes.

The generating of the by-viewpoint patent map may include extracting and recording the number of patent documents that belong to classification titles corresponding to the first viewpoint and the second viewpoint.

The first viewpoint and the second viewpoint may be problem and solution, respectively.

The first viewpoint and the second viewpoint may be selected by a user from a plurality of viewpoints.

In further another embodiment, a method of providing a by-viewpoint patent map includes: searching patent documents; and generating a tree map with respect to a first viewpoint and a second viewpoint by using the searched patent documents and displaying the tree map; wherein the displaying of the tree map comprises: displaying classification titles of the first viewpoint; receiving one, selected by a user, of the displayed classification titles of the first viewpoint; and displaying classification titles of the second viewpoint with respect to the selected classification title.

The first viewpoint and the second viewpoint may be problem and solution, respectively.

The method may further include: after the searching of the patent documents, displaying technical fields related to the by-viewpoint classification codes with respect to the searched patent documents; and selecting one of the displayed technical fields.

In still further another embodiment, a system for providing a by-viewpoint patent map includes: a storage medium for storing a program that provides a by-viewpoint patent map; and a display module for displaying the by-viewpoint patent map, wherein the program searches patent documents and generates a by-viewpoint patent map that indicates classification according to a first viewpoint and a second viewpoint based on the search results; and the display module displays a list of classification titles of the first viewpoint and, when one of the displayed classification titles is selected by a user and is received, displays classification titles of the second viewpoint with respect to the selected classification title.

The program may include: a patent document database; a search engine for searching patent documents from the patent document database; a by-viewpoint classification code extracting module for extracting a by-viewpoint classification codes from the patent documents searched by the search engine; a by-viewpoint separating module for grouping the searched patent documents by the viewpoints; and a by-viewpoint patent map generating module for generating a by-viewpoint patent map based on a viewpoint and a classification title of the by-viewpoint classification code.

The by-viewpoint patent map generating module may store a by-viewpoint patent map providing program that extracts and may record the number of patent documents that belong to classification titles corresponding to the first viewpoint and the second viewpoint.

The first viewpoint and the second viewpoint may be problem and solution, respectively.

The first viewpoint and the second viewpoint may be selected from a plurality of viewpoints.

In still further another embodiment, a storage medium for storing a by-viewpoint patent map providing program includes: a patent document database; a search engine for searching patent documents from the patent document database; a by-viewpoint classification code extracting module for extracting a by-viewpoint classification codes from the patent documents searched by the search engine; a by-viewpoint separating module for grouping the searched patent documents into a first viewpoint and a second viewpoint; and a by-viewpoint patent map generating module for generating a by-viewpoint patent map based on a viewpoint of the by-viewpoint classification codes and a classification title.

The by-viewpoint patent map generating module may extract and record the number of patent documents that belong to classification titles corresponding to the first viewpoint and the second viewpoint.

The details of one or more embodiments are set forth in the accompanying drawings and the description below. Other features will be apparent from the description and drawings, and from the claims.

BRIEF DESCRIPTION OF DRAWINGS

FIGS. 1 through 3 are views illustrating a method of generating a lookup table for rearranging viewpoint classifications and classification titles according to an embodiment of the present invention.

FIG. 5 is a classification table where searched patent documents are classified by extracted F-term codes.

FIG. 6 is a classification table where predetermined viewpoints and classification titles are assigned to the F-term code of FIG. 5.

FIG. 7 is view where the classification table of FIG. 6 is arranged with a new classification title.

FIG. 8 is a view illustrating a by-viewpoint patent map of a matrix form generated according to an embodiment of the present invention.

FIG. 14 is a screen when a plurality of by-viewpoint patent maps, which are generated by respectively different search conditions, are simultaneously displayed according to an embodiment of the present invention.

FIG. 15 is a view of a system for providing a by-viewpoint patent map according to a second embodiment of the present invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the image sensor and a method for manufacturing the same according to the present invention will be described with reference to the accompanying drawings in detail.

Hereinafter, embodiments of the present invention will be described with reference to the drawings.

Figure 3:
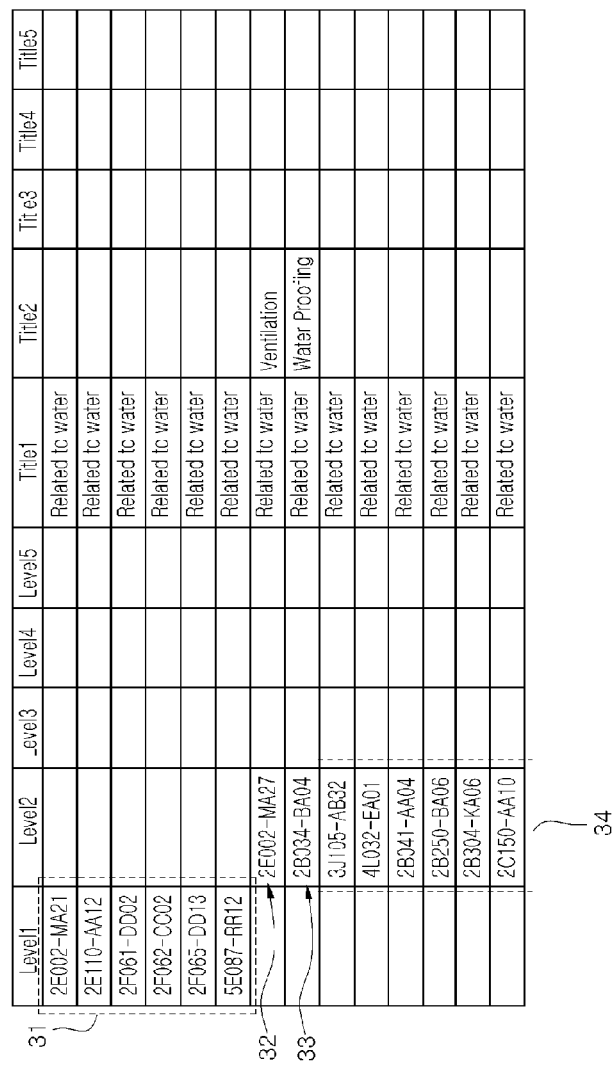

FIGS. 1 through 3 are views illustrating a method of generating a lookup table for rearranging viewpoint classifications and classification titles according to an embodiment of the present invention.

FIG. 1 illustrates a classification table for classifying patent documents by viewpoint and is a part of an F-term code table that the Japan Patent Office (JPO) develops and distributes.

The F-term code classifies patent documents by a technical theme (or, a technical field) and then classifies techniques of a corresponding theme by various viewpoints such as problem, solution, application fields.

A theme code of the F-term code of FIG. 1 is "5K102" 11 and a theme, (i.e., a technical field) is "Optical communication system" 13.

In FIG. 1, AA in sub-codes of AA00, AA01, AA02 . . . is a viewpoint code representing a technical view point, and numbers "01" and "2" are sub-codes corresponding to a specific content of a corresponding viewpoint. A sub-code ending with "00" does not contain specific contents, and a proceeding alphabet (i.e., a viewpoint code) "AA" describes contents about a kind of a viewpoint. That is, since "AA00" is "PURPOSE OR PROBLEMS", sub-codes starting with "AA" belong to purpose or problems viewpoint.

Each code name is assigned to sub-codes. A code name includes simple sentences for describing each viewpoint and is a kind of a classification title for representing which classification each sub-code indicates.

A code name of the remaining sub-codes 14 that do not end with "00" represents specific contents that a corresponding sub-code means. For example, since AA02 15 belongs to AA00, it represents classification by viewpoint of problem, and more specifically, it means classification that belongs to a purpose for increasing capacity to obtain communication capacitance.

Points in front of each code name represent a hierarchical structure of each code. According to classification, sub-codes AA01, AA02, AA08, and AA10 with one point are the highest hierarchy and sub-codes with two or three points belong to the sub hierarchy. The more points there are, the more specific classification is.

FIG. 2 illustrates a part of an intermediate classification table where the same or similar viewpoints are grouped by extracting viewpoints, sub-codes, and classification titles (i.e., code names) from classified by-theme F-term codes as shown in FIG. 1. FIG. 2 illustrates classification titles corresponding to a viewpoint of problem from each theme.

FIG. 3 illustrates a table classified by a new classification title, which is obtained by removing duplicate classification titles from the intermediate classification table classified by the viewpoints of FIG. 2 according to an embodiment of the present invention. That is, the table of FIG. 3 merges the similar ones among the viewpoints, and merges the substantially same ones and groups the similar ones among the classification titles of FIG. 2. Referring to FIG. 3, which viewpoints and classification titles in the duplicate-removed new classification titles a corresponding F-term code belongs to is recognized. Although one viewpoint (i.e., new classification titles of problem is shown in FIG. 3, classification titles arranged with respect to additional other viewpoints such as problem and application fields may be generated.

Referring to FIG. 3, an F-term code is at the left and new classification titles corresponding to the F-term are at the right. A new classification title of the F-term codes 31 and 32 is "Related water", a new classification title of the F-term code 32 is "Ventilation" and "Related water", and a new classification title of the F-term code 33 is "Water proofing" and "Related water". Here, the classification titles of "Related water", "Ventilation", and "Water proofing" are new classification titles that merge classification titles (i.e., code names) of an original F-term code of FIG. 1 with the substantially same ones. In addition, "Ventilation" and "Water" are similar classification titles and belong to a sub classification title, i.e., "Related water" of the classification title.

The original F-term code of FIG. 1 is obtained by performing a theme classification, i.e., a technical field and then classifying the technical field by viewpoint. However, referring to the lookup table of FIG. 3, there is no classification by a theme but there are only F-term codes and new classification titles corresponding thereto. A theme of the original F-term code is reflected on the new classification title. For example, if it is assumed that the same or almost similar classification titles are in a theme of "Optical communication system" and a theme of "Telephone circuits" in the original F-term code, the titles may belong to respectively different pages because they belong to respectively different themes in the F-term code classification table. However, the titles merge into one classification title in the lookup table of FIG. 3.

The F-term codes at the left of FIG. 3 are assigned with hierarchy levels of Level 1 to Level 5 and the new classification titles at the right of FIG. 3 are assigned with hierarchy levels of Title 1 to Title 5. The levels of the F-term codes at the left of FIG. 3 may be identical to levels displayed by points which are assigned to classification titles in the original F-term codes. The hierarchy levels of the new classification titles at the right of FIG. 3 may result from grouping of similar classification titles.

In the above-mentioned embodiment, the lookup table of FIG. 3 for displaying a classification title that corresponds to a by-viewpoint classification code is generated using the F-term code that the JPO distributes. However, it is impossible to generate the lookup table of FIG. 3 only with the F-term code. If techniques are classified based on viewpoints such as problem, solution, or application fields and there is a patent document database assigned with the classification code thereof, any classification codes may be used.

Since a process for generating the intermediate classification table of FIG. 2 from the initial F-term code of FIG. 1 is a data extraction and rearrangement process, it may be performed by a processing device such as a computer. However, a process for generating the lookup table of FIG. 3 by the new classification title from the intermediate classification table of FIG. 2 cannot be performed only with simple data extraction and rearrangement processes.

In this case, a text mining technique may be used. The text mining technique is one of text analysis techniques and relates to a technique for calculating frequency of a word in data such as texts or sentences, or calculating similarity between texts based on the frequency, or classifying similar texts.

By applying the text mining on code names (or, classification titles) provided to the F-term codes of FIG. 1 or FIG. 2, classification titles with similarity of more than a predetermined value are regarded as the same ones and classification titles with similarity of less than the predetermined value are regarded as similar ones, such that they may be grouped into the same group.

According to the present invention, the text mining is not for a long sentence but for a short sentence provided from the F-term code classification table. Therefore, similarity may be determined very accurately.

In the embodiment, although the F-term code that the JPO distributes is used as one example, any by-viewpoint classification codes for patent document classification besides the F-term code (that is, a patent classification code with a plurality of viewpoint codes) may be applied to the above-mentioned processes.

Figure 4:
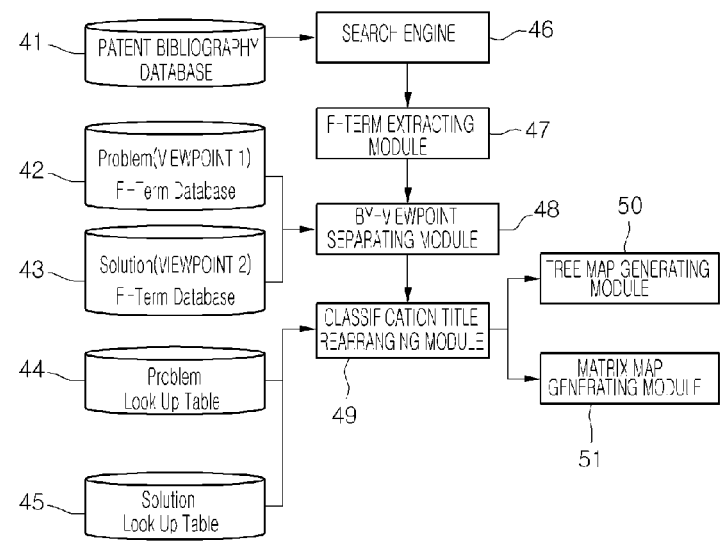
FIG. 4 is a configuration view of a system for providing a by-viewpoint patent map according to a first embodiment of the present invention.

FIG. 4 is a configuration view of a system for providing a by-viewpoint patent map according to a first embodiment of the present invention.

A patent bibliography database 41 is a database of patent documents that are a target of patent search. The patent bibliography database 41 may be a database of a government agency such as the industrial property digital library (IPDL) of Japan, European Patent Office database, and a private patent document database.

A search engine 46 searches the patent bibliography database 41 based on search conditions such as a keyword, a filing data, a published filing data, and an applicant that a user inputs. In this embodiment, it is assumed that a keyword for a thin film transistor (TFT) among liquid crystal display (LCD) techniques is inputted and then its search is performed.

An F-term extracting module 47 extracts an F-term code from the patent documents that the search engine 46 searches. As mentioned below, if the searched patent documents are not the Japan patent documents, the Japan patent corresponding to the searched patent documents is searched and substituted.

A viewpoint separating module 48 classifies the searched patent documents by the extracted F-term code using F-term databases 42 and 43 as shown in FIG. 5, provides a predetermined viewpoint and classification title, and then recodes a viewpoint classification and classification titles assigned from the F-term code as shown in FIG. 6. Through these processes, the viewpoint separating module 48 groups F-term codes of the searched patent documents by a viewpoint (i.e., which are grouped by problem and solution.

In FIGS. 5 and 6, F1 to F16 represents F-term code numbers, and PN1 to PN19 represent patent numbers. As shown in FIG. 5, the number of searched documents is 19 and the number of F-term codes of the searched patent documents is 16.

As shown in FIG. 6, F1 to F7 are classification titles of which viewpoints are problem and F7 to F16 are classification titles of which viewpoints are solution. In actual, another viewpoint such as an application field may be present besides the problem and solution but it is assumed for description that there are only two viewpoints.

A classification title rearranging module 49 performs a rearrangement process that merges viewpoint classification titles into a group by the substantially same ones as shown in FIG. 7 and groups similar ones into one group to assign a classification title In FIG. 6, the classification titles of "visibility improvement by contras enhancement" 71 and "solution to contrast problem" 72 may be regarded as the substantially same. These classification titles may be respectively different classification titles of respectively different themes in the original F-term code, but these classification titles may merge into one classification title in the by-viewpoint patent map of the present invention. In addition, since the classification titles of "mounting structure" 73 and "mounting method" 74 are the substantially same, they may merge into one classification title.

Furthermore, in FIG. 6, although "visibility improvement by contrast enhancement", "visibility improvement by high definition", and "visibility improvement by wide angle enhancement" of the F-term codes F1 to F3 are respectively different classification titles, they have visibility improvement as problem in common. Thus, they may be grouped into one in the by-viewpoint patent map that present invention provides. Likewise, although "power of driving circuit", "active device of driving circuit" and "optical conductor of driving circuit" of F-term codes F13 to F16 are respectively different classification titles, they have the driving circuit as problem in common. Thus, they may be grouped into one in the by-viewpoint patent map.

In FIG. 7, classification titles are shown after the above rearrangement process is performed. "Visibility improvement by contras enhancement" 71 and "contrast problem" 72 of FIG. 6 merge into a new classification title of "visibility improvement by contras enhancement" 75. In addition, "mounting structure" 73 and "mounting method" 74 of FIG. 6 merge into a new mounting structure 76 of "mounting structure"76.

When the arrangement process proceeds from FIG. 6 to FIG. 7, a patent analyzer may manually perform the process but the lookup table of FIG. 3 may be used to automatically perform the arrangement process. As mentioned above, referring to the lookup table of FIG. 3, the substantially same classification titles among the classification titles of the F-term code is displayed with one new classification title and similar classification titles that will be grouped into the same group are displayed. The lookup table databases 44 and 45 may generated by viewpoints such as problem and solution as shown in FIG. 4.

As mentioned below, without using the lookup table, the rearrangement process may be performed on the classification titles of FIG. 6 through a text mining technique.

A tree map generating module 50 and a matrix map generating module 51 generate a by-viewpoint patent map based on the rearranged viewpoint and classification title of FIG. 7.

Figures 9, 10:
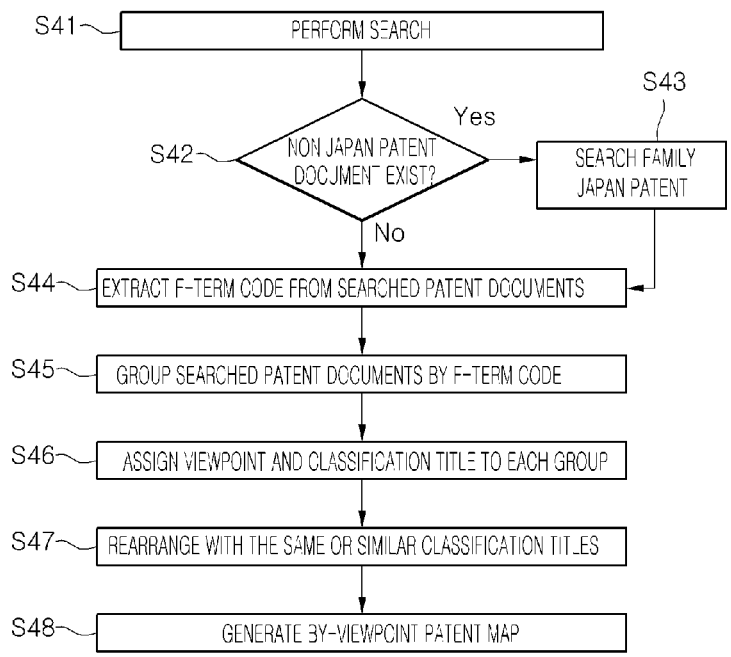
FIG. 9 is a flowchart illustrating a method of providing a by-viewpoint patent map according to a first embodiment of the present invention.
FIGS. 10 and 11 are views illustrating a by-viewpoint patent map of a tree map according to an embodiment of the present invention.
Figure 11:
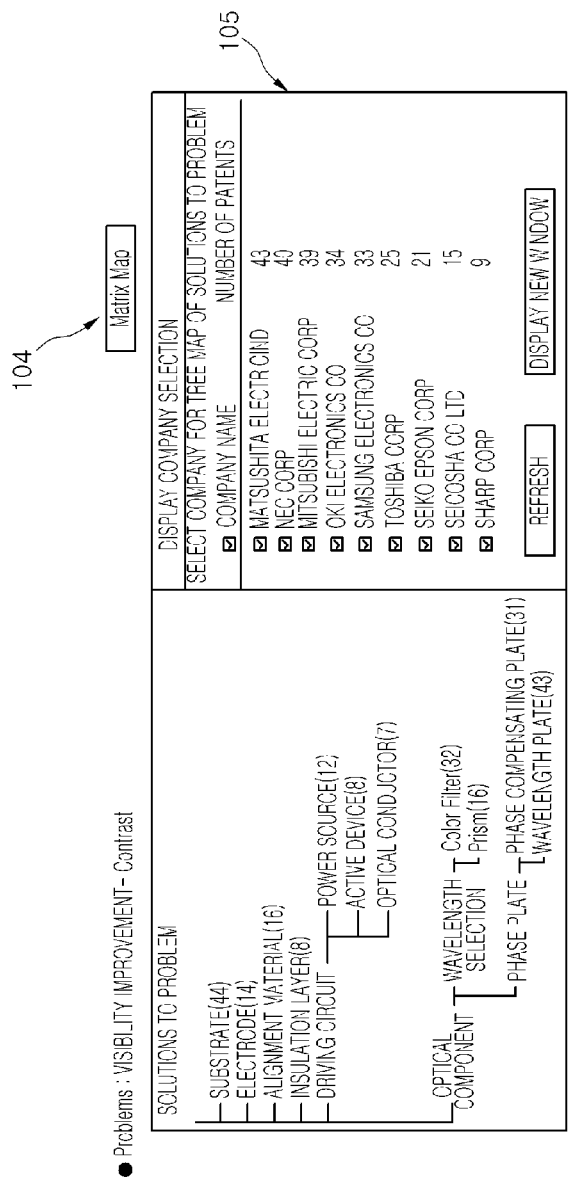

The matrix map crating module 51 generates a by-viewpoint patent map of a matrix map form as shown in FIG. 8, and the tree map generating module 50 generates a by-viewpoint patent map of a tree map form as shown in FIGS. 10 and 11.

According to embodiments, a display module for displaying the generated by-viewpoint patent map may be further included.

The above mentioned system may be configured with computer readable software except for the display module, and the computer readable software may be stored in storage medium such as a hard disk drive (HDD), a flash memory, and so forth.

The matrix map of FIG. 8 may be generated with respect to two viewpoints of the table of FIG. 7. That is, once a user selects two of the viewpoints of FIG. 7, a first viewpoint among the selected viewpoints is arranged on the horizontal axis, the second viewpoint is arranged on the vertical axis, and the number of patent documents corresponding to each classification title is extracted from the searched patent documents and recoded.

There are only two viewpoints in FIG. 7 and thus a user has almost no choice. However, since there are 20 to 30 viewpoints that are actually provided from the F-term code, a user may select two viewpoints among viewpoints corresponding to the F-term code from the searched patent documents to generate the matrix map of FIG. 8 with respect to the two viewpoints.

Various kinds of information may be obtained from the matrix map of FIG. 8. In FIG. 8, there is "visibility improvement" among problem and are various solution to achieve "visibility improvement". However, among them, the number of patent documents that suggests solution related to an electrode is the largest. Relatively, since there are smaller solution, i.e., solution for improving a driving circuit, it is expected that there are more possibilities of developing new technology if research and development are performed in the direction of improving a driving circuit. Moreover, it is known that visibility improvement is the most important issue related to TFT of an LCD panel.

Furthermore, various kinds of information extracted from the searched patent documents may be recorded in the matrix map besides the classification title and the number of patent documents. For example, as shown in FIG. 8, average application year of corresponding patent documents may be displayed on the end of the matrix map. The problem and solution (where the number of patent documentations close to the present with respect to the year information is large) may be given more weight and then examined.

FIG. 9 is a flowchart illustrating a method of providing a by-viewpoint patent map according to a first embodiment of the present invention.

In operation S41, search is performed on a patent document database through a search condition that a user inputs.

In operation S42, it is determined whether patent documents not Japan patent documents are included in the searched patent documents. If there are patent documents that are not Japan patent documents, corresponding family Japan patents are searched and replaced in operation S43. If there is no corresponding family Japan patent, they are classified into non-classifiable patent documents, and then may be excluded during the following classification process, or may be left to a user to be used for the later operations after the classification process is completed.

In operation S44, an F-term code is extracted from the searched patent documents.

The searched patent documents are arranged by the F-term code as shown in FIG. 5 in operation S46, and then predetermined viewpoints and classification titles in the F-term code are recorded as shown in FIG. 6 in operation S46, such that the F-term codes are classified by viewpoints (herein, problem and solution.

In operation S47, as mentioned above, the rearranged classification titles are given using the lookup table of FIG. 3 and the classification table is generated as shown in FIG. 7.

In operation S48, a by-viewpoint patent map of a matrix map or a tree map is generated using the rearranged classification table.

MODE FOR THE INVENTION

FIGS. 10 and 11 are views illustrating a by-viewpoint patent map of a tree map according to an embodiment of the present invention.

The tree map selects two viewpoints from the classification table of FIG. 7 and lists classification titles and the number of patent documents of the first viewpoint as shown in FIG. 10, in order to allow a user to select one among the classification titles. Then, as shown in FIG. 11, the tree map displays a classification title of a second viewpoint corresponding to each classification title that a user selects.

The tree map of FIGS. 10 and 11 may be displayed on one screen, but if the first viewpoint is the problem and the second viewpoint is the solution, when a user selects one of the problem of FIG. 10, as shown in FIG. 11, solution with respect to the problem is displayed such that a by-viewpoint patent map may be intuitively shown.

In the classification title list of FIG. 10, when a user selects visibility improvement by contrast enhancement, classification titles of solution corresponding thereto is displayed as shown in FIG. 11.

According to embodiments, by displaying a matrix map button 104 on a screen, the tree map and matrix map may be displayed in a toggle mode.

In addition, as shown in FIG. 11, extra information such as the number of patent documents by applicant or the number of patent documents by application year may be displayed on one side of the screen.

The tree map and matrix map are just one embodiment of the by-viewpoint patent map generating module according to the present invention and thus by-viewpoint patent maps of different forms may be generated according to embodiments.

Figures 12, 13:
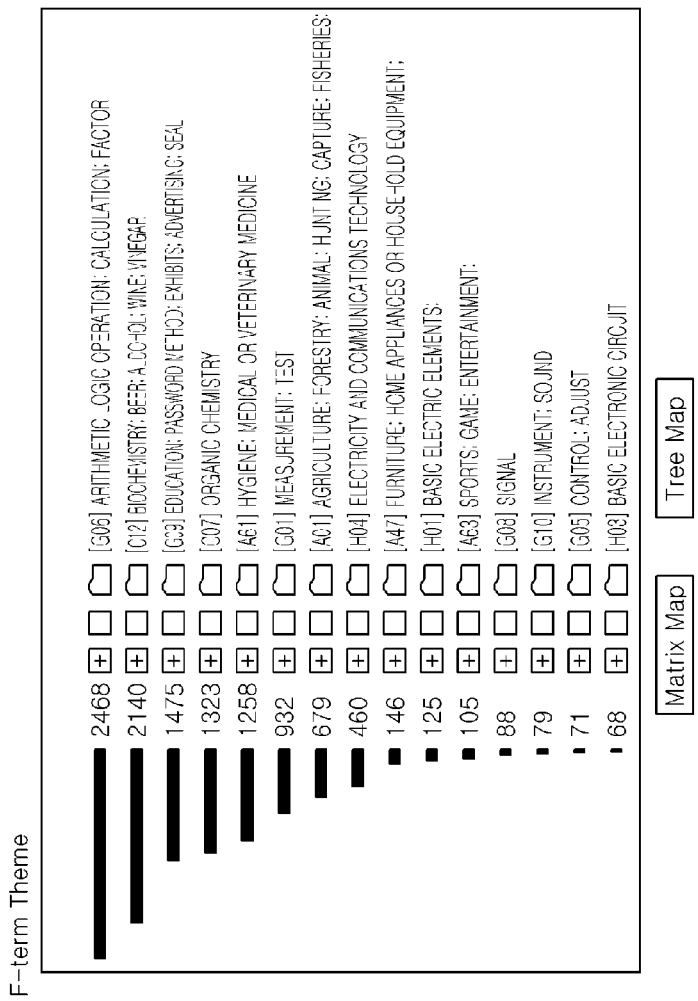
FIG. 12 is a screen for setting a technical field in a patent search result according to an embodiment of the present invention.
FIG. 13 is view illustrating a user interface that allows a user to merge classification titles according to an embodiment of the present invention.

According to the embodiment, the search engine 46 of FIG. 4 performs a search operation. After the F-term code extracting module 47 extracts an F-term code from the searched patent documents, a theme of the F-term code may be selected. For this, a screen of FIG. 12 is provided to a user such that only patent documents belonging to the theme of a predetermined F-term code among the searched patent documents may be used for the next process. The theme of the F-term code corresponds to a technical field and thus a by-viewpoint patent map may be provided based on patent documents belonging to a specific technical field among the searched patent documents.

Moreover, after the extracting of the F-term code in operation S44 of FIG. 9, a theme of the F-term code is selected such that a by-viewpoint patent map may be provided based on patent documents belonging to a specific technical filed among the searched patent documents.

FIG. 13 is view illustrating a user interface that allows a user to merge classification titles according to an embodiment of the present invention.

For example, if a user thinks that there is still the substantially same classification title after the performing of the rearrangement process to remove duplicates, the automatically generated by-viewpoint patent map as shown in FIG. 8, FIG. 10, or FIG. 11 may provide an interface through which a user directly merges the classification titles.

As shown in FIG. 13, the classification titles may be merged by using a button 107 and the classification titles may be deleted by using a button 108.

FIG. 14 is a screen when a plurality of by-viewpoint patent maps, which are generated by respectively different search conditions, are simultaneously displayed according to an embodiment of the present invention.

For example, after applicant information is extracted from bibliography information of the searched patent documents, only patent documents about two specific applicants are extracted and then by-viewpoint patent maps 110 and 120 may be generated by each applicant. Next, as shown in FIG. 14, the by-viewpoint patent map generated by each applicant may be displayed on one screen simultaneously. Through this screen configuration, a user may obtain information by each applicant. By displaying a button 102, a matrix map and a tree map may be toggled.

FIG. 15 is a view of a system for providing a by-viewpoint patent map according to a second embodiment of the present invention.

Operations of a patent bibliography database 41, F-term data bases 42 and 43, a search engine 46, an F-term extracting module 47, and a viewpoint separating module 48 are the same as those of FIG. 4. In the embodiment of FIG. 14, the rearranged classification title is not assigned and a by-viewpoint patent map is directly generated from the classification table of FIG. 6. Unlike the by-viewpoint patent map of FIG. 8, 10, or 11, referring to the by-viewpoint patent map generated according to this embodiment, the substantially same classification titles are not redundantly removed like the F-term code classification table and then are displayed distinctively. This embodiment may be applied when a rearrangement of classification titles is not required. The system of this embodiment does not perform a rearrangement operation, and thus does not require a lookup table.

Figure 16:
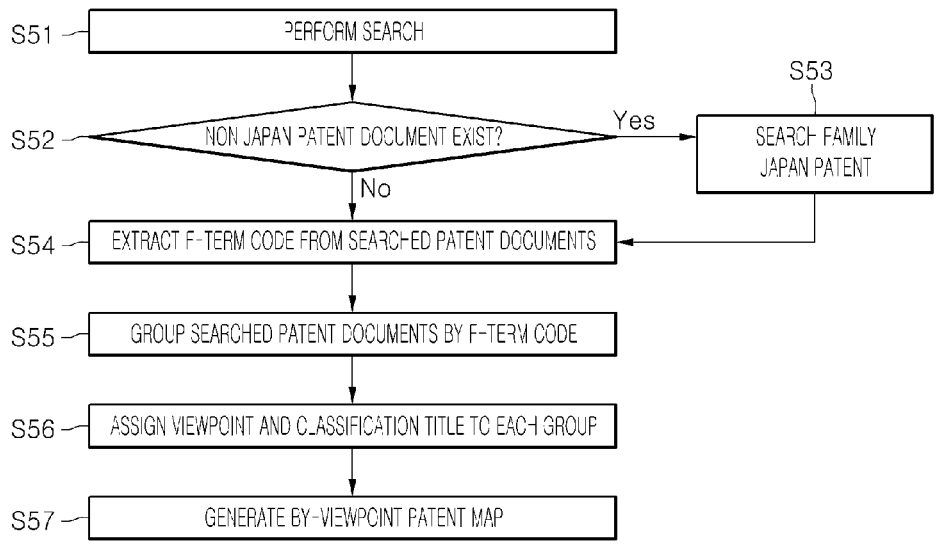
FIG. 16 is a flowchart illustrating a method of providing a by-viewpoint patent map according to a second embodiment of the present invention.

FIG. 16 is a flowchart illustrating a method of providing a by-viewpoint patent map according to a second embodiment of the present invention.

Except that a rearranged classification title is not assigned when patent documents are classified by an F-term code and a by-viewpoint patent map is directly generated, other operations are the same as the first embodiment of FIG. 9.

Figure 17:
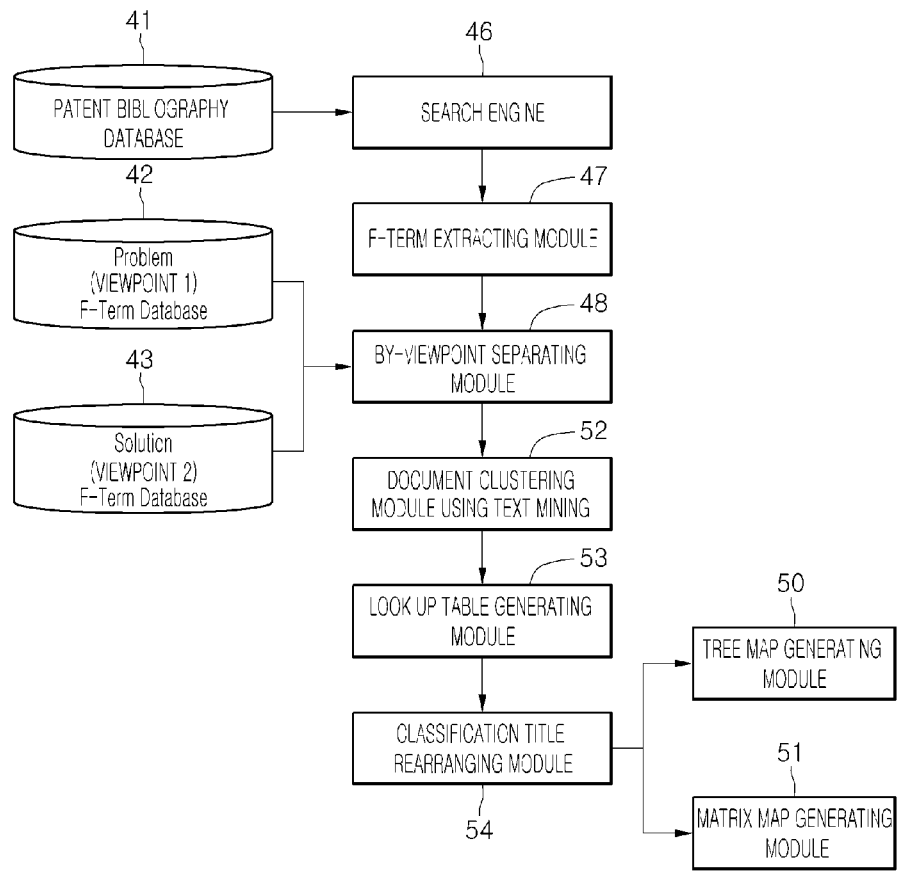
FIG. 17 is a configuration view of a system for providing a by-viewpoint patent map according to a third embodiment of the present invention.

FIG. 17 is a configuration view of a system for providing a by-viewpoint patent map according to a third embodiment of the present invention.

Operations of a patent bibliography data base 41, F-term databases 42 and 43, a search engine 46, an F-term extracting module 47, and a viewpoint separating module 48 are the same as those of FIG. 4. In the system of this embodiment, although rearranging of a classification title is performed, a text mining technique is used without the already generated lookup table of FIG. 3.

A text mining module 52 performs a text mining operation on each classification title when a viewpoint and a classification title are assigned by the F-term code as shown in FIG. 6, such that similarity may be determined.

According to the present invention, the text mining operation is not performed on a long sentence or text but is performed on a predetermined short sentence provided from the F-term code classification table, such that similarity may be very accurately determined.

A lookup table generating module 53 classifies classification titles into the same ones or similar ones based on the similarity in order to generate a lookup table.

A classification title rearranging module 54 generates a rearranged classification table like FIG. 7 based on the lookup table.

According to embodiments, the lookup table generating module 53 may be omitted and the classification title rearranging module 54 may arrange classification titles based on data that the text mining module 52 performs a text mining operation.

A tree map generating module 50 and a matrix map generating module 51 generate a viewpoint patent map of a tree map or a matrix map based on the rearranged classification title.

Figure 18:
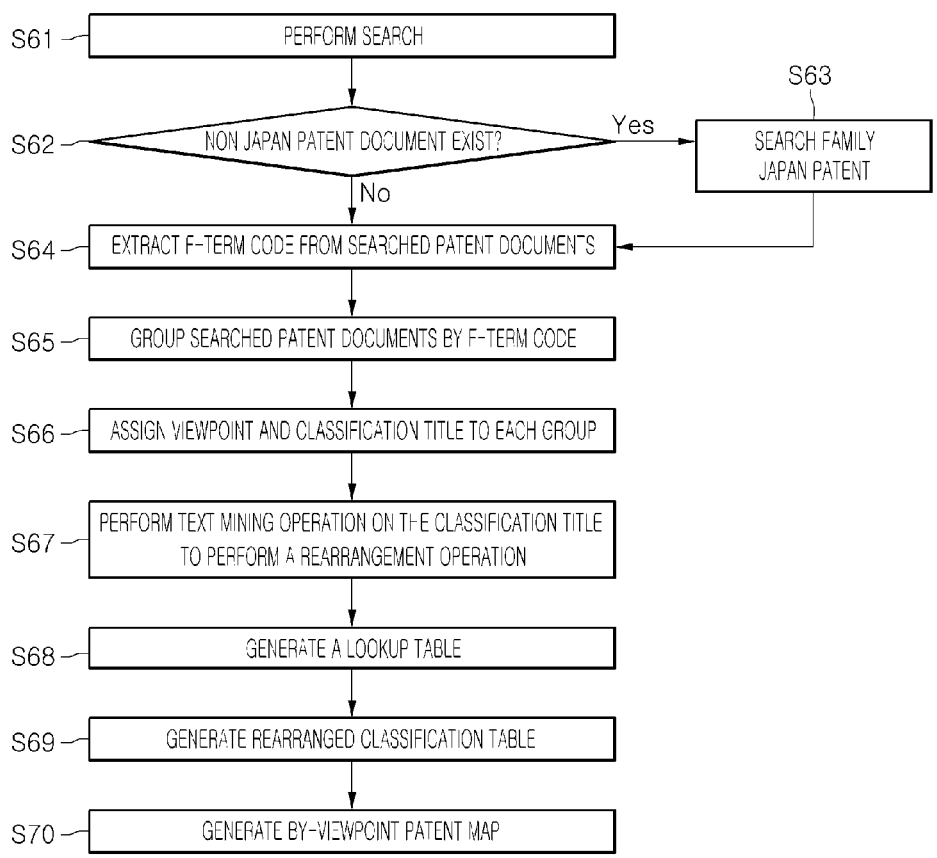
FIG. 18 is a flowchart illustrating a method of providing a by-viewpoint patent map according to a third embodiment of the present invention.

FIG. 18 is a flowchart illustrating a method of providing a by-viewpoint patent map according to a third embodiment of the present invention.

Operations S61 to S66 are the same as those of the first embodiment.

In operation S67, as shown in FIG. 6, in the classification table where the F-term and classification title are assigned, a text mining operation is performed on the classification title to perform a rearrangement operation.

In operation S68, based on the rearranged data, a lookup table configured with a new classification title is generated.

In operation S69, the rearranged classification table like FIG. 7 is generated based on the lookup table.

In operation S70, a by-viewpoint patent map is generated based on the rearranged classification title.

According to embodiment, generating of a lookup table of operation S68 based on the rearranged data is omitted and then a rearranged classification table may be generated directly.

According to the present invention, a tool for obtaining differentiated patents by effectively analyzing distribution and contents of a prior art may be provided.

According to the present invention, by suggesting more systemized idea development operations, intuitive and improved idea improvement may be provided.

According to the present invention, when research developers face limitations related to product developments, a by-viewpoint patent map for providing solutions to resolve the limitations may be provided.

According to the present invention, an intuitive and easily understandable by-viewpoint patent map may be provided by classifying an idea into problem and solution and diagrammatizing them in a tree form or a matrix form.

According to the present invention, a method of generating a by-viewpoint patent map reduces consumed time for analyzing extensive patent documents and provides systemized idea development processes.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of providing a by-viewpoint patent map, the method comprising:
    searching patent documents to which by-viewpoint classification codes are assigned, wherein a plurality of classification titles are assigned to the by-viewpoint classification codes, and the plurality of classification titles relate to a plurality of technical fields;
    extracting the by-viewpoint classification codes from the searched patent documents;
    classifying the searched documents by the by-viewpoint classification codes;
    grouping the by-viewpoint classification codes into a first viewpoint and a second viewpoint;
    grouping the plurality of classification titles into a plurality of rearranged classification titles, wherein the number of the plurality of rearranged classification titles is smaller than the number of the plurality of classification titles, and the plurality of technical fields are reflected on the plurality of rearranged classification titles;
    generating a by-viewpoint patent map based on the plurality of rearranged classification titles assigned to the by-viewpoint classification codes; and
    displaying the generated by-viewpoint patent map.

2. The method according to claim 1, wherein the generating of the by-viewpoint patent map comprises extracting and recording the number of patent documents that belong to classification titles corresponding to the first viewpoint and the second viewpoint.

3. The method according to claim 1, comprising:
    arranging the plurality of rearranged classification titles corresponding to the first viewpoint and the second viewpoint on a horizontal axis and a vertical axis, respectively; and
    displaying the number of the searched patent documents corresponding to the arranged classification titles.

4. The method according to claim 3, wherein the first viewpoint and the second viewpoint are problem and solution, respectively.

5. The method according to claim 1, wherein the generating of the by-viewpoint patent map comprises:
  displaying a list of classification titles of the first viewpoint;
  receiving one, selected by a user, of the displayed classification titles; and
  displaying classification titles of the second viewpoint with respect to the selected classification title.

6. The method according to claim 1, further comprising:
  displaying a list of classification titles of the first viewpoint;
  receiving one, selected by a user, of the displayed classification titles of the first viewpoint; and
  displaying classification titles of the second viewpoint with respect to the selected classification title.

7. The method according to claim 6, wherein the generating of the by-viewpoint patent map comprises extracting and recording the number of patent documents that belong to classification titles corresponding to the first viewpoint and the second viewpoint.

8. The method according to claim 6, wherein the first viewpoint and the second viewpoint are problem and solution, respectively.

9. The method according to claim 6, wherein the first viewpoint and the second viewpoint are selected by a user from a plurality of viewpoints.

10. A method of providing a by-viewpoint patent map, the method comprising:
  searching patent documents to which by-viewpoint classification codes are assigned, wherein a plurality of classification titles are assigned to the by-viewpoint classification codes, and the plurality of classification titles relate to a plurality of technical fields;
  extracting the by-viewpoint classification codes from the searched patent documents;
  classifying the searched documents by the by-viewpoint classification codes;
  grouping the by-viewpoint classification codes into a first viewpoint and a second viewpoint;
  grouping the plurality of classification titles into a plurality of rearranged classification titles, wherein the number of the plurality of rearranged classification titles is smaller than the number of the plurality of classification titles, and the plurality of technical fields are reflected on the plurality of rearranged classification titles;
  generating a tree map with respect to a first viewpoint and a second viewpoint based on the plurality of rearranged classification titles assigned to the by-viewpoint classification codes; and
  displaying the tree map,
  wherein the displaying of the tree map comprises:
    displaying classification titles of the first viewpoint;
    receiving one, selected by a user, of the displayed classification titles of the first viewpoint; and
    displaying classification titles of the second viewpoint with respect to the selected classification title.

11. The method according to claim 10, wherein the first viewpoint and the second viewpoint are problem and solution, respectively.

12. The method according to claim 10, further comprising:
  after the searching of the patent documents, displaying technical fields related to the by-viewpoint classification codes with respect to the searched patent documents; and
  selecting one of the displayed technical fields.

13. A system for providing a by-viewpoint patent map, the system comprising:
  a storage medium for storing a program that provides a by-viewpoint patent map; and
  a display module for displaying the by-viewpoint patent map,
  wherein the program is configured to
    search patent documents to which by-viewpoint classification codes are assigned, wherein a plurality of classification titles are assigned to the by-viewpoint classification codes, and the plurality of classification titles relate to a plurality of technical fields;
    extract the by-viewpoint classification codes from the searched patent documents;
    classify the searched documents by the by-viewpoint classification codes;
    group the by-viewpoint classification codes into a first viewpoint and a second viewpoint;
    group the plurality of classification titles into a plurality of rearranged classification titles, wherein the number of the plurality of rearranged classification titles is smaller than the number of the plurality of classification titles, and the plurality of technical fields are reflected on the plurality of rearranged classification titles; and
    generate a tree map with respect to a first viewpoint and a second viewpoint based on the plurality of rearranged classification titles assigned to the by-viewpoint classification codes, and
  the display module is configured to display a list of classification titles of the first viewpoint and, when one of the displayed classification titles is selected by a user and is received, to display classification titles of the second viewpoint with respect to the selected classification title.

14. The system according to claim 13, wherein the by-viewpoint patent map generating module is configured to store a by-viewpoint patent map providing program that extracts and records the number of patent documents that belong to classification titles corresponding to the first viewpoint and the second viewpoint.

15. The system according to claim 13, wherein the first viewpoint and the second viewpoint are problem and solution, respectively.

16. The system according to claim 13, wherein the first viewpoint and the second viewpoint are selected from a plurality of viewpoints.

17. A non-transitory storage medium for storing a by-viewpoint patent map providing program that performs a method comprising:
  searching, from patent document database, patent documents to which by-viewpoint classification codes are assigned, wherein a plurality of classification titles are assigned to the by-viewpoint classification codes, and the plurality of classification titles relate to a plurality of technical fields;
  extracting the by-viewpoint classification codes from the patent documents;
  classifying the searched documents by the by-viewpoint classification codes;
  grouping the by-viewpoint classification codes into a first viewpoint and a second viewpoint;
  grouping the plurality of classification titles into a plurality of rearranged classification titles, wherein the number of the plurality of rearranged classification titles is smaller than the number of the plurality of classification titles, and the plurality of technical fields are reflected on the plurality of rearranged classification titles; and
  generating a by-viewpoint patent map based on the plurality of rearranged classification title.

18. The non-transitory storage medium according to claim 17, wherein the generating of the by-viewpoint patent map comprises extracting and recording the number of patent documents that belong to classification titles corresponding to the first viewpoint and the second viewpoint.

\* \* \* \* \*